No. 633,411. Patented Sept. 19, 1899.
J. & W. ARGYLE.
COMBINED TOBACCO PIPE AND WHISTLE.
(Application filed Sept. 23, 1898.)
(No Model.)
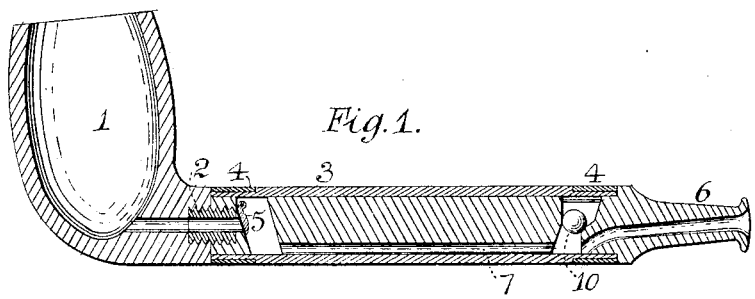
Fig. 1.
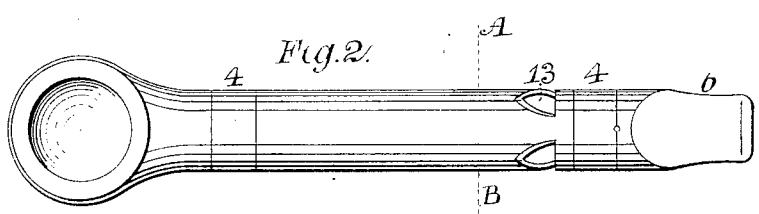
Fig. 2.
Fig. 3.
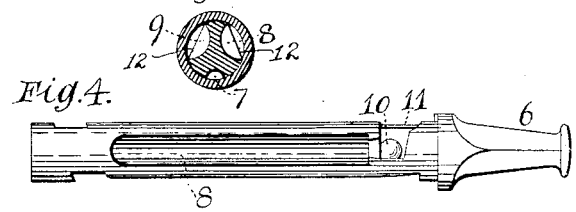
Fig. 4.
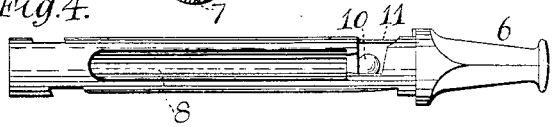
Fig. 5.
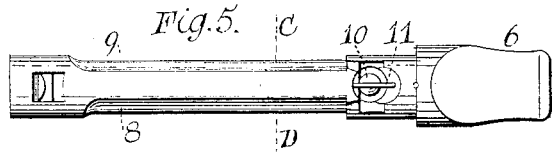
Fig. 7.
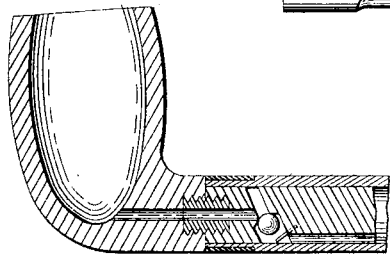
Fig. 6.
Witnesses:
H. W. Gough.
J. H. Gough.
Inventors.
James Argyle.
William Argyle.
THE NORRIS PETERS CO., PHOTO-LITHO., WASHINGTON, D. C.

UNITED STATES PATENT OFFICE.

JAMES ARGYLE AND WILLIAM ARGYLE, OF ALFRETON, ENGLAND.

COMBINED TOBACCO-PIPE AND WHISTLE.

SPECIFICATION forming part of Letters Patent No. 633,411, dated September 19, 1899.

Application filed September 23, 1898. Serial No. 691,732. (No model.)

*To all whom it may concern:*

Be it known that we, JAMES ARGYLE and WILLIAM ARGYLE, engineers, subjects of the Queen of Great Britain, residing at Alfreton, Derbyshire, England, have invented certain new and useful Improvements in a Combined Tobacco-Pipe and Whistle, of which the following is a specification.

Figure 1 shows a longitudinal sectional view of a tobacco-pipe and whistle or alarm combined; Fig. 2, a plan of the same; Fig. 3, a cross-section on the line A B, Fig. 2; Fig. 4, a side view of a grooved stem provided with valves and terminating in a mouthpiece, and Fig. 5 a plan of the same; Fig. 6, a cross-section on the line C D, Fig. 5; Fig. 7, a longitudinal sectional view of a tobacco-pipe head provided with a ball-valve instead of a plate-valve.

The corresponding parts in each figure are numbered alike where necessary.

Each combined tobacco-pipe and whistle or alarm consists of the following parts: A short-stemmed tobacco-pipe head 1, connected by a screw-threaded perforated nipple 2 to a tube 3, provided with a ferrule 4 at each end to prevent it from splitting. The stem of the head terminates in a plate-valve 5. The tube 3 receives the stem of the mouthpiece 6, having a groove 7 on its lower side, through which the smoke is drawn from the pipe-head. The stem of the mouthpiece has two grooves 8 and 9, one on each side, of different lengths, which, with the tube 3, form two whistles producing two notes. The stem is provided with a chamber or recess communicating with the ends of the grooves 8 and 9 which lie nearest the mouthpiece 6, and in said chamber is placed a ball-valve 10, which is retained in said chamber by a pin 11, the ends of the latter being secured in the walls or sides of the chamber. A similar ball-valve may be used instead of the plate-valve 5, as illustrated in Fig. 7. Portions of the stem are cut away on the sides to form flat wall-surfaces 12, one of which lies on each side of the ball-valve 10, as shown at Figs. 3 and 6, and in line with the parts cut away the tube 3 is cut through on each side at 13 to allow air to pass when the whistle is blown.

The combined tobacco-pipe and whistle may have the pipe-bowl, outer tube with metal ferrules, and stemmed mouthpiece made of wood, porcelain, ebonite, vulcanite, or other suitable material, and the ball-valves may be made of steel, bone, ivory, or other hard substance.

The combined pipe and whistle acts as follows: When used, the smoke when drawn through it raises the plate-valve 5 to allow a free passage, the ball-valve 10 closing the entrance to the whistle or alarm. When the mouthpiece is blown through to sound the whistle, the ball 10 rises and the hinged valve 5 closes the entrance to the pipe-bowl.

What we claim is—

1. A combined pipe and whistle comprising a bowl or head, a tube connected therewith and having openings through which the air to the whistles passes, a mouthpiece inserted in said tube and having independent grooves of different lengths communicating at one end with a chamber, a valve in said chamber, and a valve at the inner end of the stem in a chamber in communication with the smoke-passage of the stem and mouthpiece and controlling the passage in the head or bowl, substantially as described.

2. A combined tobacco-pipe and whistle consisting of a head or bowl, a stem having longitudinal smoke-passage on its under side and two longitudinal grooves of different lengths independent of the smoke-passage and communicating with a chamber at the outer end of said stem, a tube connected with the bowl and cut away and having openings communicating with said chamber, a ball-valve in said chamber, a mouthpiece in the outer end of said tube having a passage communicating with said chamber and with the smoke-passage of the stem and a valve in a chamber at the inner end of the stem and controlling the passage of the bowl, all substantially as herein shown and described.

In testimony whereof we have hereunto set our hands, in presence of two subscribing witnesses, this 12th day of September, 1898.

JAMES ARGYLE.
WILLIAM ARGYLE.

Witnesses:
H. W. GOUGH,
J. H. GOUGH.